United States Patent
Brookreson et al.

(10) Patent No.: US 7,802,125 B2
(45) Date of Patent: Sep. 21, 2010

(54) OVER CLOCKING DETECTING AND PERMITTING ACCESS TO STORED OVER CLOCKING INDICATOR IN A POWER DOWN STATE

(75) Inventors: Chris J. Brookreson, Saint Helens, OR (US); Daniel R. Bockelman, Portland, OR (US); Benjamin M. Mauck, Portland, OR (US); Louie Y. Liu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 11/644,347

(22) Filed: Dec. 22, 2006

(65) Prior Publication Data

US 2008/0150570 A1    Jun. 26, 2008

(51) Int. Cl.
*G06F 1/00* (2006.01)
*G06F 1/04* (2006.01)
*H03D 13/00* (2006.01)

(52) U.S. Cl. .................. 713/500; 713/600; 327/42

(58) Field of Classification Search ................. 713/500
See application file for complete search history.

(56) References Cited

U.S. PATENT DOCUMENTS

| | | | |
|---|---|---|---|
| 5,592,111 A * | 1/1997 | Wong et al. | 327/45 |
| 5,731,733 A | 3/1998 | Denham | |
| 5,959,445 A | 9/1999 | Denham | |
| 6,255,893 B1 | 7/2001 | Dishongh et al. | |
| 6,535,988 B1 | 3/2003 | Poisner | |
| 6,754,840 B2 * | 6/2004 | Poisner | 713/500 |
| 7,089,441 B2 * | 8/2006 | Goodrich et al. | 713/500 |
| 7,222,254 B2 * | 5/2007 | Kurts et al. | 713/600 |
| 7,321,978 B2 * | 1/2008 | Brodsky | 713/500 |
| 7,343,512 B2 * | 3/2008 | Brown | 713/600 |
| 2003/0065966 A1 * | 4/2003 | Poisner | 713/500 |
| 2005/0060595 A1 * | 3/2005 | Kurts et al. | 713/600 |
| 2006/0129867 A1 * | 6/2006 | Brodsky | 713/500 |

* cited by examiner

*Primary Examiner*—Suresh K Suryawanshi
(74) *Attorney, Agent, or Firm*—Blakely, Sokoloff, Taylor & Zafman LLP

(57) ABSTRACT

A method and an apparatus to detect over clocking of a processor are illustrated. The over clocking detector may detect as to whether the system clock of a microprocessor is over clocked and then generate an over clocking indicator. The over clocking indicator may be stored and accessed at a later time. The over clocking indicator may be retrieved through a test access port.

19 Claims, 5 Drawing Sheets

OVER CLOCKING DETECTING AND PERMITTING ACCESS TO STORED OVER CLOCKING INDICATOR IN A POWER DOWN STATE

BACKGROUND

A computer system typically includes one or more microprocessors that are designed to operate at certain clock frequencies. However, the clock speed of a processor may be adjusted by the end user for a variety of reasons. For example, enthusiasts and gamers often increase clock speed to improve the performance of their system. Unfortunately, distributors of processors may also over clock processors to fool buyers into thinking that the processor is a higher end product.

The main problem with over clocking is that the processor will operate with much greater risk for reliability problems and malfunction. If a malfunction occurs, the end user may attempt to replace the processor through the manufacturer's warranty. However, in most cases, the warranty will not cover processors that have been over clocked.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other instances, well known methods, procedures, components and circuits have not been described in detail so as not to obscure the present invention. Further, exemplary sizes, values and ranges may be given, but it should not be understood that the present invention is limited to these specific example.

References in the specification to "one embodiment", "an embodiment", or "an exemplary embodiment", indicate that the embodiment described may include a particular feature, structure, or characteristic, but not every embodiment necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
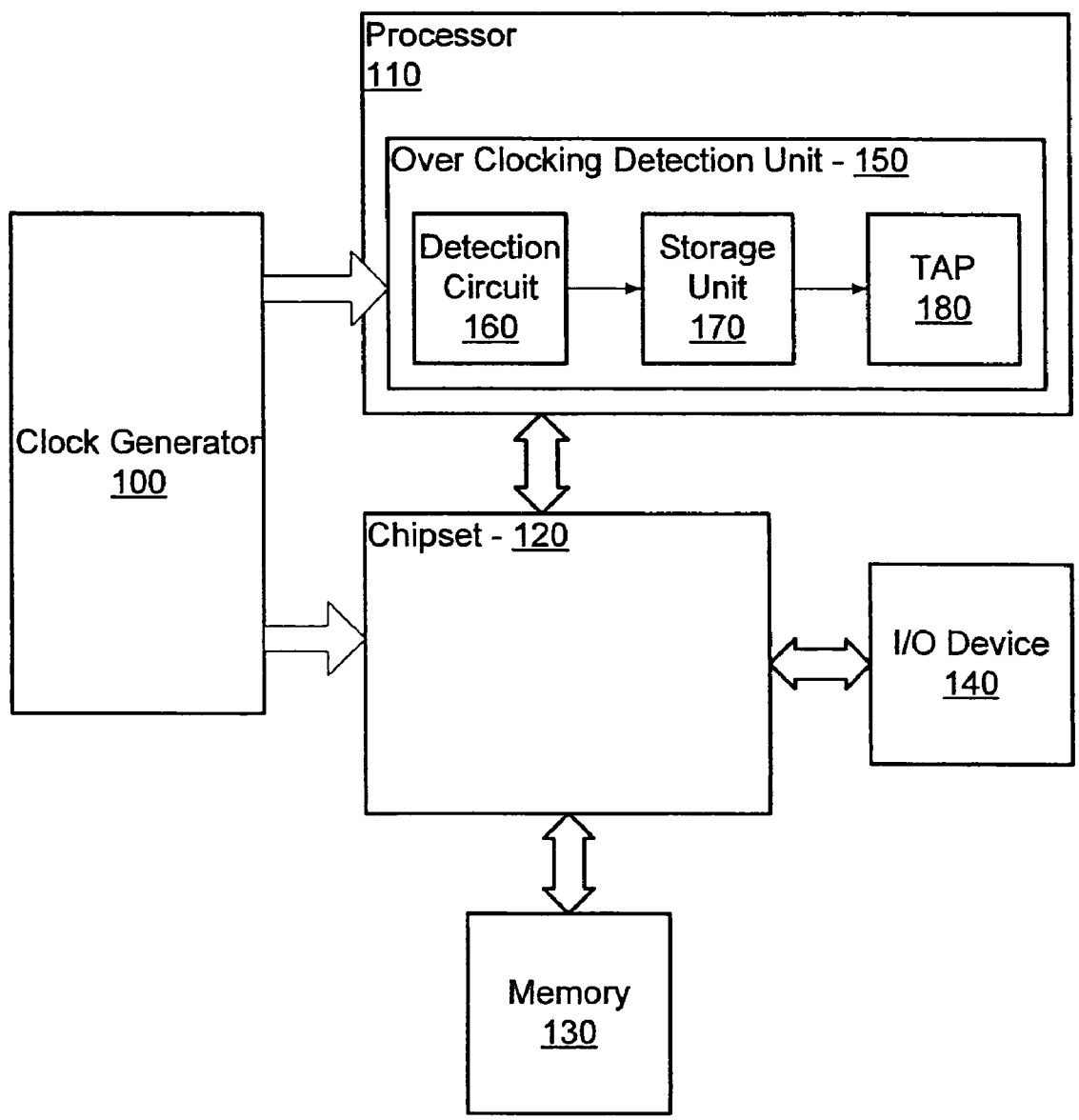
FIG. 1 illustrates an embodiment of a computer system.

Referring to FIG. 1, an embodiment of a computer system is illustrated. The computer system may comprise a clock generator 100, a processor 110, a chipset 120, a memory 130 and an input output (I/O) device 140. As depicted, the clock generator 100 may be coupled to the processor 110 and the chipset 120. The processor 110 may be coupled with the chipset 120. The memory 130 may be coupled with the chipset 120 and the I/O device 140 may be coupled with the chipset 120.

The clock generator 100, in one embodiment, may comprise frequency dividers and/or multipliers which may receive an external clock and processor clock frequency selection signals. For example, if the processor clock frequency selection indicates a processor clock frequency of 333 MHz and the external clock is 166 MHz, then the frequency multiplier may be used to multiply the external clock by a factor of two to generate a system clock signal of 333 MHz.

In one embodiment, the processor 110 may include an over clocking detection unit 150. The over clocking detection unit 150 may be used to detect whether the clock speed of the processor 110 has been over clocked or increased beyond its recommended operating limit. If the processor 110 is over clocked beyond a predetermined threshold, then the over clocking detection unit 150 may generate and store an over clocking indicator.

As depicted, the over clocking detection unit 150 may comprise a detection circuit 160, a storage unit 170 and a test access port (TAP) 180. The detection circuit 160 may be coupled to the storage unit 170 and the storage unit 170 may be connected with the TAP 180. The detection circuit 160 of the detection unit 150 may receive the clock signal and a reference clock signal to detect whether the clock signal is over clocked.

The detection circuit 160 may generate an over clocking indicator if the clock signal is greater than a predetermined threshold over a reference clock signal that is set at the clock signal's intended frequency. Generally, if the processor is over clocked by about 15% to about 20%, then there is a greatly increased risk of damage to the processor. Therefore, the predetermined threshold may also be set from about 15% to about 20% greater than the reference clock signal.

The over clocking indicator may be stored in the storage unit 170 so that the over clocking of the processor may be detected upon inspection. In one embodiment, the storage unit 170 may be a fuse-based storage cell that enables easy detection. The storage unit 170 may keep the over clocking indicator stored therein even after the processor is powered down. In one embodiment, the over clocking indicator may be detected even if the processor is powered down. The test access port 180 may facilitate reading of the indicator from the storage unit 170. The chipset 120 may comprise one or more integrated circuits or chips to couple the processor 110 with other components of the computer system, such as the memory 130 and the I/O device 140.

The memory 130 may comprise, for example, RAM (Random Access Memory) devices such as source synchronous dynamic RAM devices and DDR (Double Data Rate) RAM devices. The I/O device 140 may implement various input/output functions for the computer system such as hard disk drives, keyboards, mice, CD (compact disc) drives, DVD (digital video discs) drives, printers, and scanners.

Figure 2:
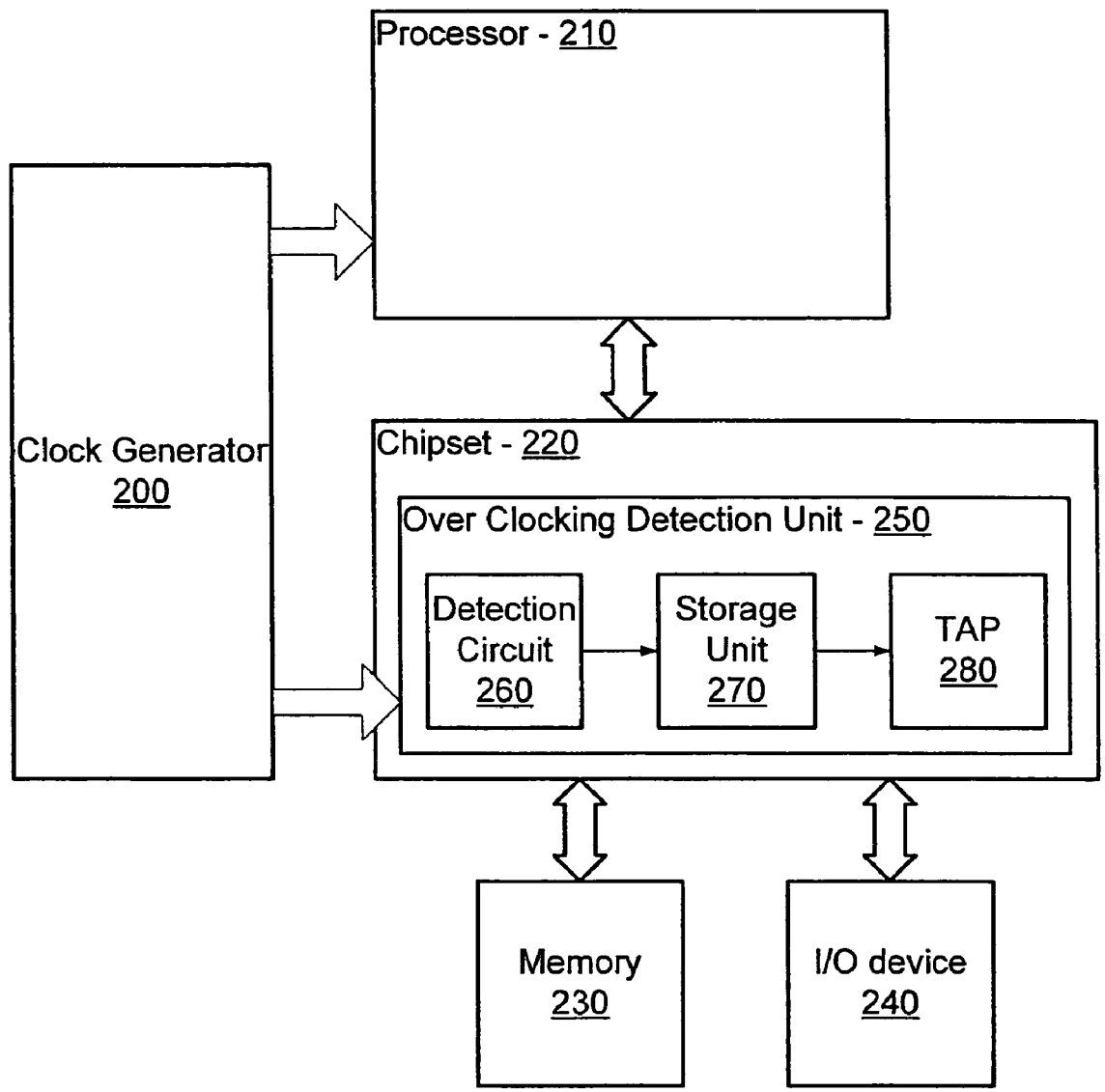
FIG. 2 illustrates another embodiment of a computer system.

Referring now to FIG. 2, another embodiment of a computer system is illustrated. The system may for example include a clock generator 200, a processor 210, a chipset 220, a memory 230 and an input-output (I/O) device 240. As depicted, the clock generator 200 may be coupled to the processor 210 and the chipset 220. The processor 210 may be coupled with the chipset 220. The memory 230 may be coupled with the chipset 220 and the I/O device 240 may be coupled with the chipset 220.

As depicted, the chipset 220 in this embodiment, may comprise an over clocking detection unit 250. The over clocking detection unit 250 may detect whether the processor 210 has been over clocked by the user. If the processor 210 is over clocked then the over clocking detection unit 250 may generate and store an over clocking indicator. In one embodiment, the indicator may be detected even if the processor is powered down. The chipset 220, in one embodiment, may comprise one or more integrated circuits or chips to couple the processor 210 with other components of the computer system, such as the memory 230 and the I/O device 240.

Figure 3:
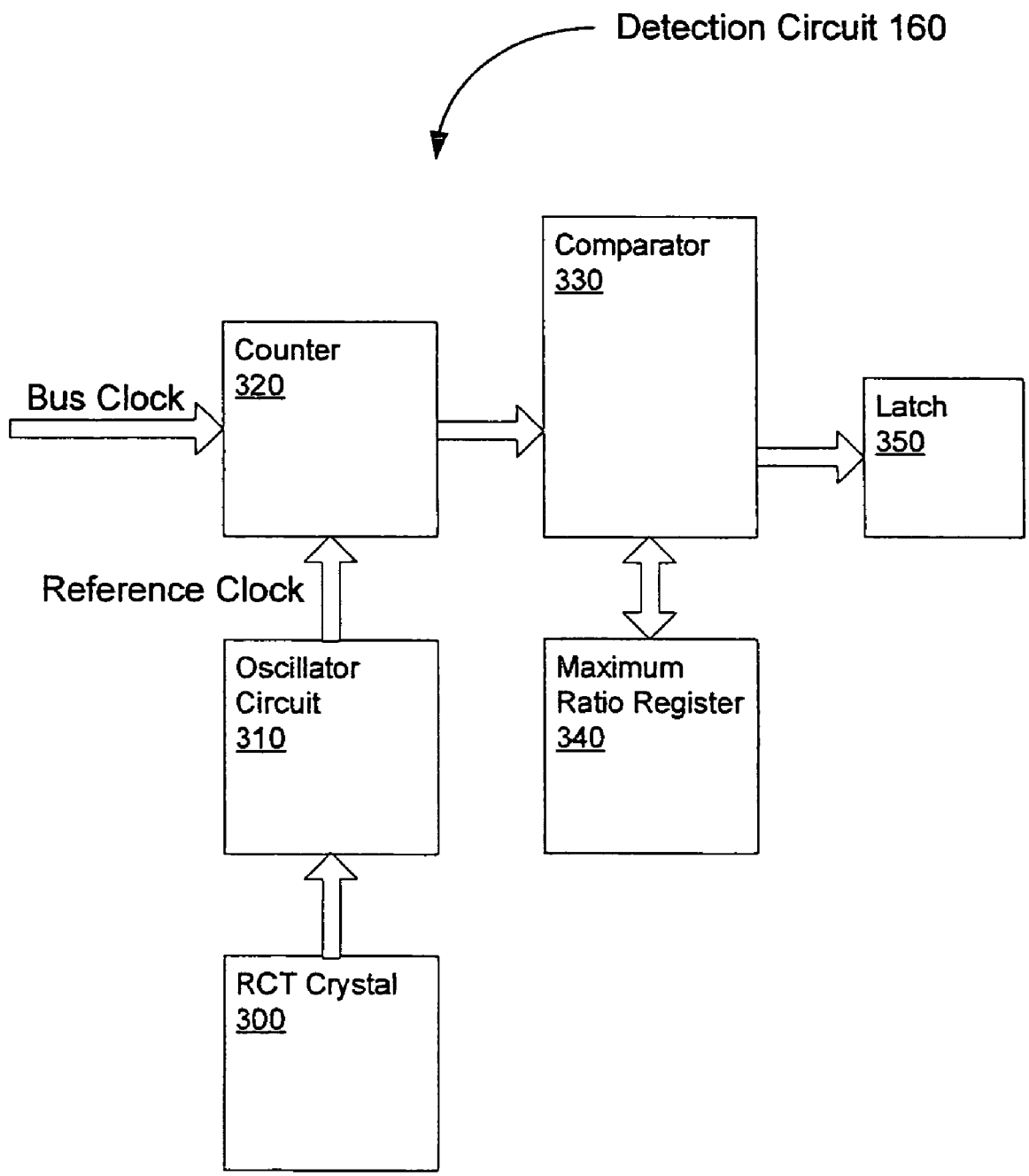
FIG. 3 illustrates an embodiment of a detection circuit.

Referring now to FIG. 3, one embodiment of an over clocking detection circuit 160 is illustrated. As depicted, the over clocking detection circuit 160 may comprise a real time clock (RTC) crystal 300, an oscillator circuit 310, a counter 320, a comparator 330, a maximum ratio register 340, and a latch 350. The RTC crystal 300 may be coupled to an oscillator 310 which may be coupled to a counter 320. The counter 320 may be coupled to comparator 330 and the comparator may be coupled to a maximum ratio register 340 and to a latch 350.

In one embodiment, the RTC crystal 300 may generate a reference clock signal of a predetermined value. The RTC crystal 300 may transmit the reference clock signal to the oscillator 310 provided to ensure passage of the reference clock signal of the predetermined value. The oscillator 310 may transmit the reference clock signal to the counter 320. The counter 320 may count the clock signal, which may be over clocked, relative to the reference clock signal. The counter 320 may transmit the reference clock signal to the comparator 320.

In one embodiment, the counter 320 may receive the clock signal and may transmit the clock signal to the comparator 320. The comparator 320 may compare the counter value with a predetermined threshold provided from a maximum allowed ratio register 340. The comparator 330 may latch its output indicating an over clocking detection through a latch 350.

In one embodiment, the counter 320 may be clocked by an input system or processor clock signal, which may be an over clocked clock signal. The counter 320 may be set or reset to zero, by a rising edge of the reference clock signal having to count the system clock relative to the reference clock. For example, if the system clock is 333 MHz and the reference clock is generated by a 32.768 kHz RTC crystal, the counter 320 may be set to count approximately 10000 clocks. If the counter value is more than the 10000 clocks, then the system clock signal may be determined as over clocked.

In one embodiment, the comparator 330 may determine such an over clocking of the system clock, based on a comparison of the ratio of the system clock signal and the reference clock signal using maximum allowed ratio provided from the maximum ratio register 340. For example, if the counter value reaches the maximum allowed ratio, the comparator output may be indicate that an over clocking condition has been detected. In one embodiment, the comparator 330 may generate an over clocking indicator if the system clock is over clocked.

Figure 4:
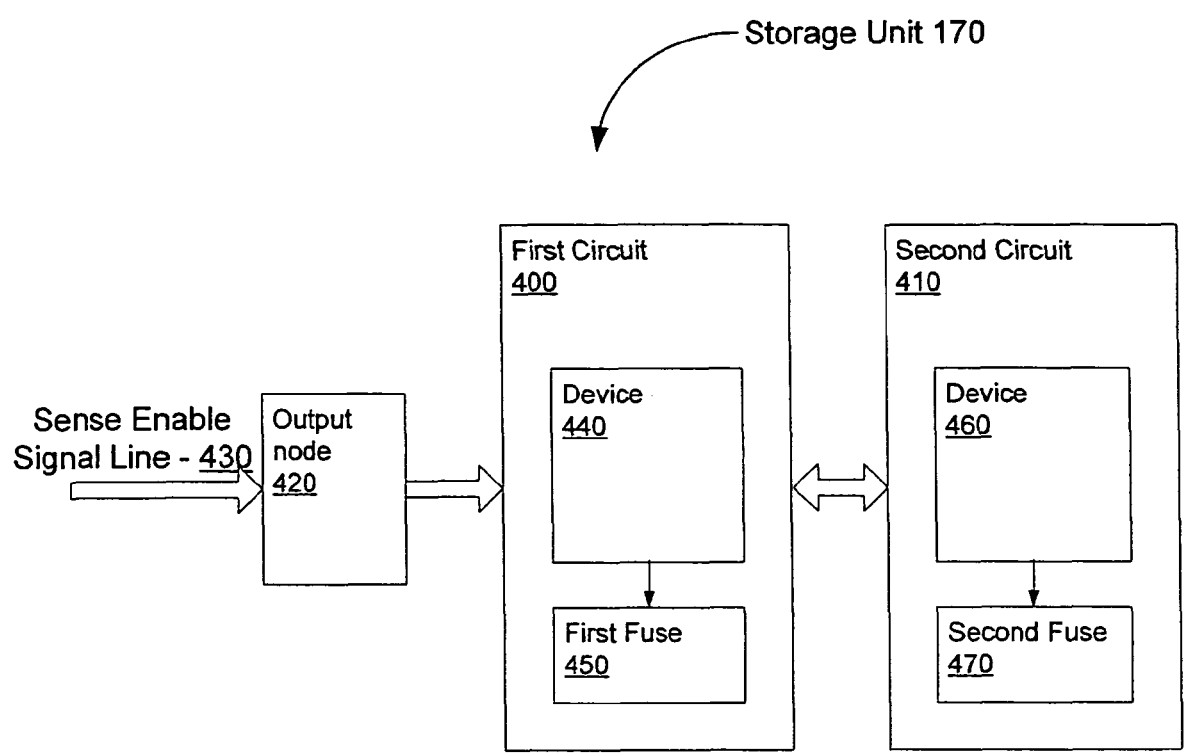
FIG. 4 illustrates an embodiment of a storage unit.

Reference is now made to FIG. 4, an embodiment of a storage unit 170 is illustrated. The storage unit 170 may keep the over clocking indicator stored therein even after the processor is powered down. As depicted, the storage unit 170 may comprise a first circuit 400, a second circuit 410, an output node 420 and a sense enable signal line 430. The first circuit 400 may be coupled to the second circuit 410 in a current mirror configuration. The first circuit 400 may also be coupled to an output node 420 which may be coupled to a sense enable signal line 430.

As depicted, the first circuit 400 may comprise a first fuse 450, such as for example a set fuse and one or more devices 440 coupled to the first fuse 450. The second circuit 410 may comprise a second fuse 470, such as for example a clear fuse and one or more devices 460 coupled to the second fuse 470. Each of the devices may be matched with the corresponding device in the other circuit.

In one embodiment, the set fuse 450 and the clear fuse 470 may comprise same type of the fuse and may be matched in properties, such as lithography, orientation, material and processing. The fuses 450 and 470 may have resistance similar to each other when they are in the same state and may vary in the same manner in response to similar condition. The fuses 450 and 470 may, for example, comprise a fuse which may be programmed using low current level. In one embodiment, the fuses 450 and 470 may comprise a flash memory element.

The sense enable signal line 430, in one embodiment, may receive a sense enable signal, such as for example, initializing signal. As the sense enable signal transition from a low (0) to a high (1) state (i.e. asserted state) upon reset, transistor or transistors may be turned ON and a device, such as for example, a sensing device 460 may be turned ON. The device 460, in the ON condition may create path between voltage supply and the sensing device 460 of the second circuit 410 may pull the gate of the sensing device 460 up causing it to conduct its function. As the sensing device 460 is turned ON, the sensing device may limit the reference voltage across the node 420. In this manner, the storage unit may be self biased. The reference voltage may however be dynamic and may be changed in response to the logic value stored by the storage unit. The output node 420, in one embodiment, may in response to the sense enable signal received from the sense enable line 430, indicate logic "1" if the first fuse 450 is programmed and the second fuse 470 is unprogrammed. The output node 420 may further indicate logic "0" if the second fuse is programmed and the first fuse is unprogrammed.

Figure 5:
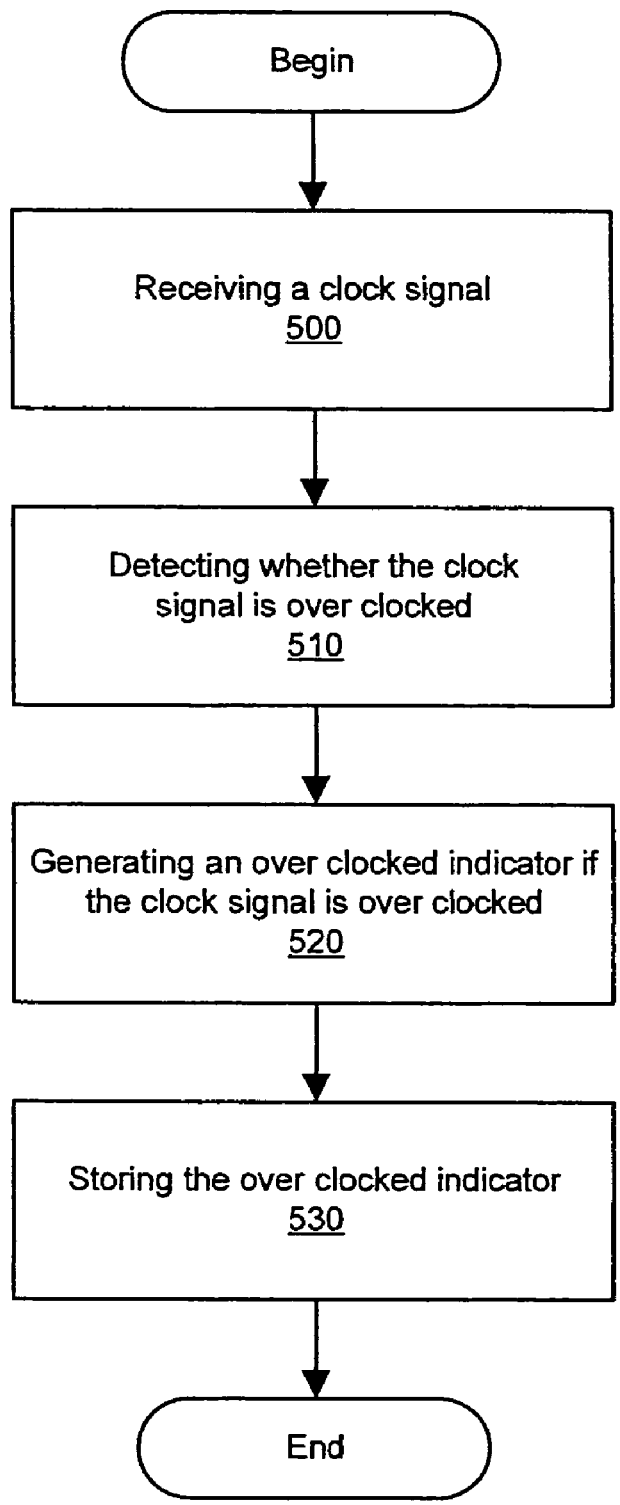
FIG. 5 illustrates an embodiment of a process, to detect over clocking of a processor, which may be implemented by the system of FIGS. 1 and 2.

Reference is now made to FIG. 5, an embodiment of a method of an over clocking detector is illustrated. In block 500, the counter of the over clocking detection circuit may receive a clock signal. The counter may also receive a reference clock signal, which may be generated by a real time clock (RTC) crystal. The RTC crystal may be coupled to an oscillator provided to ensure passage of the reference clock signal. The oscillator may transmit the reference clock to the counter.

In block 510, the method may detect if the clock signal is over clocked. The counter may be set or reset to zero, by a rising edge of the reference clock signal. The counter may count the system clock signal relative to the reference clock signal. In one embodiment, if the clock signal is greater than the reference clock signal by a predetermined threshold, a comparator may generate an over clocking indicator in a block 520.

In one embodiment, the comparator may determine such an over clocking based on a comparison of the ratio of the system clock and the reference clock signal using a maximum allowed ratio provided from the maximum ratio register. For example, if the counter value reaches the maximum allowed ratio, the comparator may generate the over clocking indicator.

In block 530, the over clocking indicator may be stored so that the information may be retrieved at a later time. The over clocking indicator may be stored in a fuse-based storage cell and accessed through a test access port. In this manner, the processor manufacturer may then easily determine whether the processor was over clocked.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   receiving a clock signal by a processor;
   detecting whether the clock signal is over clocked;
   generating an over clocking indicator if the clock signal is over clocked; and
   storing the over clocking indicator in a fuse based storage cell, wherein the fuse based storage cell is operable to permit detection of the stored over clocking indicator when the processor is in a power down state.

2. The method of claim 1, wherein detecting comprises comparing the clock signal with the reference clock signal.

3. The method of claim 2, wherein generating comprises generating an over clocking indicator if the clock signal is greater than a predetermined threshold over the reference clock signal.

4. The method of claim 3, wherein the predetermined threshold is 15% greater than the reference signal.

5. The method of claim 2, wherein the predetermined threshold is 20% greater than the reference signal.

6. The method of claim 1, wherein the fuse based storage cell comprises a first fuse storage cell coupled with a second fuse storage cell via a current mirror configuration.

7. An apparatus comprising:
   a clock generator to generate a clock signal; and
   a processor coupled to the clock generator to receive the clock signal, the processor comprising:
      a detection circuit to detect over clocking of the clock signal and to generate an over clocking indicator; and
      a storage unit coupled to the detection circuit to store the over clocking indicator, wherein the storage unit is operable to permit detection of the stored over clocking indicator when the processor is in a power down state.

8. The apparatus of claim 7, wherein the detection circuit comprises:
   a counter for receiving the clock signal; and
   a comparator coupled to the counter and operable to generate the over clocking indicator if the clock signal is greater than a predetermined threshold over a reference clock signal.

9. The apparatus of claim 8, wherein the comparator is coupled to a maximum ratio register.

10. The apparatus of claim 9, wherein the maximum ratio register is operable to detect when the clock signal is 20% greater than the reference clock signal.

11. The apparatus of claim 7, wherein the storage unit is a fuse-based storage cell and is operable to store the over clocking indicator when the processor is in the power down state.

12. The apparatus of claim 7, further comprising a test access port coupled to the storage unit and operable to read the over clocking indicator from the storage unit when the processor is in the power down state.

13. The apparatus of claim 11, wherein the fuse-based storage cell comprises a first fuse storage cell coupled with a second fuse storage cell via a current minor configuration.

14. A computer system comprising:
   a clock generator for generating a clock signal;
   a processor coupled to the clock generator to receive the clock signal; and
   a chipset coupled to the processor, wherein the chipset comprises:
      a detection circuit to detect over clocking of the clock signal and to generate an over clocking indicator; and
      a storage unit coupled to the detection circuit to store the over clocking indicator, wherein the storage unit is operable to permit detection of the stored over clocking indicator when the processor is in a power down state.

15. The computer system of claim 14 further comprising a test access port coupled to the storage unit and operable to read the over clocking indicator from the storage unit during the power down state of the processor.

16. The computer system of claim 14, wherein the detection circuit comprises:
   a counter for receiving the clock signal; and
   a comparator coupled to the counter and operable to generate an over clocking indicator if the clock signal is greater than a reference clock signal.

17. The computer system of claim 16, wherein the comparator is coupled to a maximum ratio register.

18. The computer system of claim 17, wherein the maximum ratio register is operable to detect when the clock signal is 20% greater than the reference clock signal.

19. The computer system of claim 14, wherein the storage unit is a fuse-based storage cell which is operable to store the over clocking indicator when the processor is in the power down state.

* * * * *